(12) United States Patent
Maldonado et al.

(10) Patent No.: US 12,647,812 B2
(45) Date of Patent: Jun. 2, 2026

(54) LARGE-SCALE EVENT DETECTION USING VORONOI CELLS

(71) Applicant: T-Mobile Innovations LLC, Overland Park, KS (US)

(72) Inventors: Ivan Maldonado, Apopka, FL (US); Chris Poirier, Titusville, FL (US); David Lee Anthony Ramirez, Apopka, FL (US)

(73) Assignee: T-Mobile Innovations LLC

( * ) Notice: Subject to any disclaimer, the term of this patent is extended or adjusted under 35 U.S.C. 154(b) by 416 days.

(21) Appl. No.: 18/463,257

(22) Filed: Sep. 7, 2023

(65) Prior Publication Data

US 2025/0088884 A1 Mar. 13, 2025

(51) Int. Cl.
H04W 24/10 (2009.01)
H04L 41/06 (2022.01)
H04W 16/18 (2009.01)

(52) U.S. Cl.
CPC ............. H04W 24/10 (2013.01); H04L 41/06 (2013.01); H04W 16/18 (2013.01)

(58) Field of Classification Search
CPC ........ H04W 24/10; H04W 16/18; H04L 41/06
See application file for complete search history.

(56) References Cited

U.S. PATENT DOCUMENTS

| | | | |
|---|---|---|---|
| 6,420,968 B1 | 7/2002 | Hirsch | |
| 9,949,230 B1* | 4/2018 | Meredith | .............. H04W 16/14 |
| 10,270,796 B1 | 4/2019 | Veeraswamy et al. | |
| 10,880,754 B1* | 12/2020 | Orbigo | .................. H04W 16/18 |
| 11,252,052 B1 | 2/2022 | Babu Balasubramani et al. | |
| 11,432,170 B1 | 8/2022 | Osinski et al. | |
| 11,902,306 B1 | 2/2024 | Satish | |
| 12,057,994 B1* | 8/2024 | Gonzalez | ............ H04L 41/0654 |

(Continued)

FOREIGN PATENT DOCUMENTS

| | | | | |
|---|---|---|---|---|
| CN | 116299704 A | * | 6/2023 | ............. G01V 1/307 |
| CN | 120848584 A | * | 10/2025 | |

(Continued)

OTHER PUBLICATIONS

Office Action dated Oct. 6, 2023, U.S. Appl. No. 18/308,514, filed Apr. 27, 2023.

(Continued)

*Primary Examiner* — Charles T Shedrick

(57) ABSTRACT

A method for maintaining a telecommunications carrier network that provides communication services to subscribers. The method includes associating each of a plurality of cell sites of the telecommunications carrier network with a Voronoi cell in a Voronoi diagram; trimming at least one of the Voronoi cells that includes a coastal border or a national border; receiving a first plurality of alarms associated with some of the cell sites; determining that a subset of the first plurality of alarms are associated with an LSE based on a) alarm quantity, b) alarm signature, c) occurrence time of the alarm, and d) the distance between Voronoi cell of each alarm; generating an LSE incident report; and resolving the LSE incident report by implementing a control response for the cell sites associated with the LSE incident report to clear the alarms on those cell sites.

20 Claims, 10 Drawing Sheets

(56) References Cited

U.S. PATENT DOCUMENTS

| | | | |
|---|---|---|---|
| 12,113,662 | B1 * | 10/2024 | Lumpkins ........... H04L 41/0609 |
| 2007/0198695 | A1 | 8/2007 | Engelmann et al. |
| 2008/0261611 | A1 * | 10/2008 | Mia ....................... H04W 16/18 |
| | | | 455/456.1 |
| 2010/0017247 | A1 * | 1/2010 | Liu ....................... H04W 16/18 |
| | | | 705/7.27 |
| 2011/0130135 | A1 * | 6/2011 | Trigui ................... H04W 24/08 |
| | | | 455/423 |
| 2011/0287770 | A1 * | 11/2011 | Kumar .................. H04W 16/18 |
| | | | 455/446 |
| 2012/0315925 | A1 * | 12/2012 | Ioppe .................... H04W 4/029 |
| | | | 455/456.3 |
| 2014/0187250 | A1 * | 7/2014 | Kolavennu ........... H04W 16/18 |
| | | | 455/446 |
| 2015/0126204 | A1 * | 5/2015 | Rodriguez Crespo ........................ |
| | | | H04W 16/30 |
| | | | 455/446 |
| 2015/0302123 | A1 * | 10/2015 | Gloss ................... H04L 43/045 |
| | | | 703/13 |
| 2017/0168884 | A1 * | 6/2017 | Bray ................... G06F 11/0709 |
| 2018/0368001 | A1 * | 12/2018 | Vanhatupa ............ H04W 16/18 |
| 2022/0107858 | A1 | 4/2022 | Jain et al. |
| 2022/0417105 | A1 * | 12/2022 | Parker, Jr. ............. H04L 45/123 |
| 2024/0364577 | A1 | 10/2024 | Lumpkins et al. |
| 2025/0023768 | A1 | 1/2025 | Gonzalez et al. |

FOREIGN PATENT DOCUMENTS

| | | | | | |
|---|---|---|---|---|---|
| ES | 2596705 | T3 | * | 1/2017 | ........... H04W 16/18 |
| TW | 201706965 | A | * | 2/2017 | |
| WO | WO-2008042013 | A2 | * | 4/2008 | ............. H04L 41/12 |
| WO | WO-2012108540 | A1 | * | 8/2012 | ......... H04W 64/006 |

OTHER PUBLICATIONS

Lumpkins, Robert D. et al., "Association of Related Incidents to a Telecommunication Network Large-Scale Event," filed Apr. 27, 2023, U.S. Appl. No. 18/308,514.

Gonzalez, Jose A. et al., "Telecommunication Network Large-Scale Event Root Cause Analysis," filed Jul. 14, 2023, U.S. Appl. No. 18/352,982.

Final Office Action dated Apr. 18, 2024, U.S. Appl. No. 18/308,514, filed Apr. 27, 2023.

Notice of Allowance dated Apr. 5, 2024, U.S. Appl. No. 18/352,982, filed Jul. 14, 2023.

"Main Concept Text." Ericsson Technology Review, The IP.com Journal, China.

Notice of Allowance dated May 22, 2024, U.S. Appl. No. 18/308,514, filed Apr. 27, 2023.

Gonzalez, Jose A. et al., "Telecommunication Network Large-Scale Event Root Cause Analysis," filed Jul. 4, 2024, U.S. Appl. No. 18/764,150.

* cited by examiner

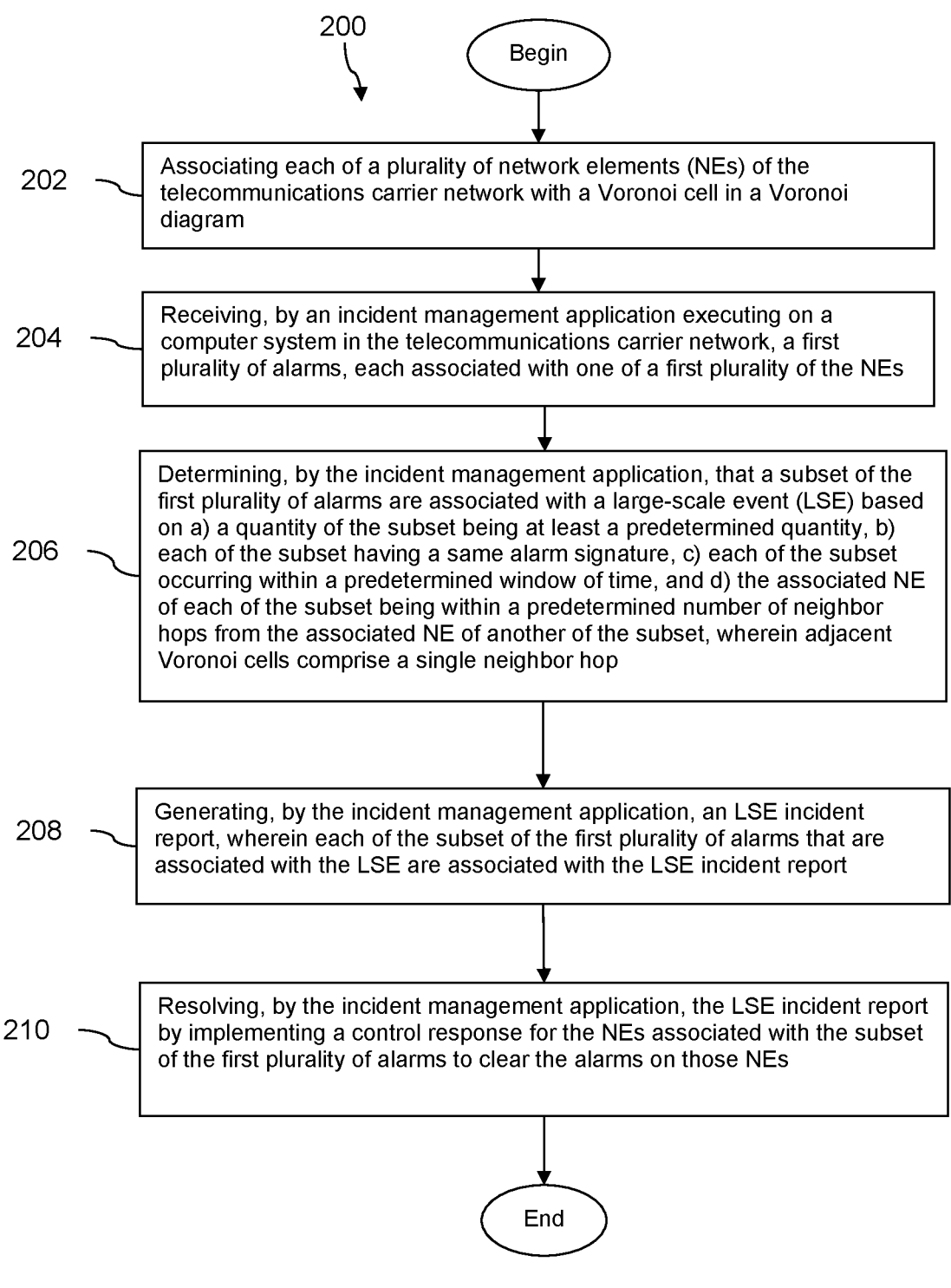

200

Begin

202 — Associating each of a plurality of network elements (NEs) of the telecommunications carrier network with a Voronoi cell in a Voronoi diagram 204 — Receiving, by an incident management application executing on a computer system in the telecommunications carrier network, a first plurality of alarms, each associated with one of a first plurality of the NEs 206 — Determining, by the incident management application, that a subset of the first plurality of alarms are associated with a large-scale event (LSE) based on a) a quantity of the subset being at least a predetermined quantity, b) each of the subset having a same alarm signature, c) each of the subset occurring within a predetermined window of time, and d) the associated NE of each of the subset being within a predetermined number of neighbor hops from the associated NE of another of the subset, wherein adjacent Voronoi cells comprise a single neighbor hop 208 — Generating, by the incident management application, an LSE incident report, wherein each of the subset of the first plurality of alarms that are associated with the LSE are associated with the LSE incident report 210 — Resolving, by the incident management application, the LSE incident report by implementing a control response for the NEs associated with the subset of the first plurality of alarms to clear the alarms on those NEs End

FIG. 4

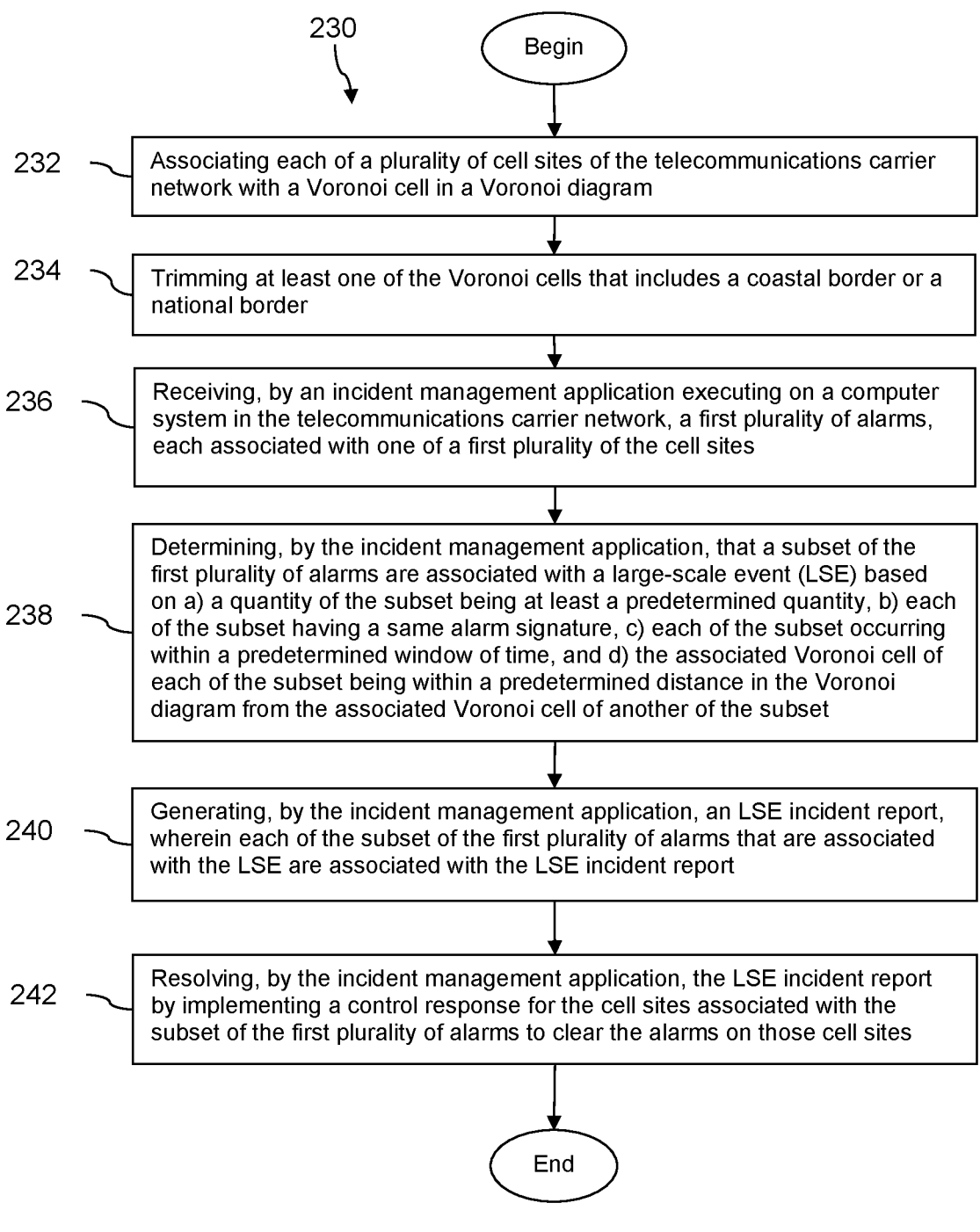

230

Begin

232 — Associating each of a plurality of cell sites of the telecommunications carrier network with a Voronoi cell in a Voronoi diagram 234 — Trimming at least one of the Voronoi cells that includes a coastal border or a national border 236 — Receiving, by an incident management application executing on a computer system in the telecommunications carrier network, a first plurality of alarms, each associated with one of a first plurality of the cell sites 238 — Determining, by the incident management application, that a subset of the first plurality of alarms are associated with a large-scale event (LSE) based on a) a quantity of the subset being at least a predetermined quantity, b) each of the subset having a same alarm signature, c) each of the subset occurring within a predetermined window of time, and d) the associated Voronoi cell of each of the subset being within a predetermined distance in the Voronoi diagram from the associated Voronoi cell of another of the subset 240 — Generating, by the incident management application, an LSE incident report, wherein each of the subset of the first plurality of alarms that are associated with the LSE are associated with the LSE incident report 242 — Resolving, by the incident management application, the LSE incident report by implementing a control response for the cell sites associated with the subset of the first plurality of alarms to clear the alarms on those cell sites

End

LARGE-SCALE EVENT DETECTION USING VORONOI CELLS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication network operators build systems and tools to monitor their networks, to identify network elements (NEs) that need maintenance, to assign maintenance tasks to personnel, and to fix network elements. Operational support systems (OSSs) may be provided by vendors of NEs to monitor and maintain their products. When trouble occurs in NEs, the OSS and/or the NEs may generate an alarm notification. An incident reporting system may be provided by the network operator to track incident reports which may be assigned to employees to resolve one or more pending alarms. A network operation center (NOC) may provide a variety of workstations and tools for NOC personnel to monitor alarms, close incident reports, and maintain the network as a whole. It is understood that operating and maintaining a nationwide communication network comprising tens of thousands of cell sites and other NEs is very complicated.

SUMMARY

In an embodiment, a method for maintaining a telecommunications carrier network that provides communication services to subscribers is disclosed. The method includes associating each of a plurality of cell sites of the telecommunications carrier network with a Voronoi cell in a Voronoi diagram; trimming at least one of the Voronoi cells that includes a coastal border or a national border; receiving, by an incident management application executing on a computer system in the telecommunications carrier network, a first plurality of alarms, each associated with one of a first plurality of the cell sites; determining, by the incident management application, that a subset of the first plurality of alarms are associated with a large-scale event (LSE) based on a) a quantity of the subset being at least a predetermined quantity, b) each of the subset having a same alarm signature, c) each of the subset occurring within a predetermined window of time, and d) the associated Voronoi cell of each of the subset being within a predetermined distance in the Voronoi diagram from the associated Voronoi cell of another of the subset; generating, by the incident management application, an LSE incident report, where each of the subset of the first plurality of alarms that are associated with the LSE are associated with the LSE incident report; and resolving, by the incident management application, the LSE incident report by implementing a control response for the cell sites associated with the subset of the first plurality of alarms to clear the alarms on those cell sites.

In another embodiment, a telecommunication network management system implemented in a telecommunications carrier network is disclosed. The system includes an incident reporting application that executes on a first computer system, where the incident reporting application creates incident reports pursuant to alarms on network elements (NEs) of the telecommunication carrier network, where one of the incident reports is associated with a large-scale event (LSE), and where the LSE incident report identifies alarms at a plurality of different NEs associated with the LSE. The system also includes an incident management application that executes on a second computer system, where the incident management application is configured to associate the NEs with a Voronoi cell in a Voronoi diagram; determine that a subset of the first plurality of alarms are associated with a large-scale event (LSE) based on a) a quantity of the subset being at least a predetermined quantity, b) each of the subset having a same alarm signature, c) each of the subset occurring within a predetermined window of time, and d) the associated NE of each of the subset being within a predetermined number of neighbor hops from the associated NE of another of the subset, where adjacent Voronoi cells comprise a single neighbor hop; and generate an LSE incident report, where each of the subset of the first plurality of alarms that are associated with the LSE are associated with the LSE incident report.

In yet another embodiment, a method for maintaining a telecommunications carrier network that provides communication services to subscribers is disclosed. The method includes associating each of a plurality of network elements (NEs) of the telecommunications carrier network with a Voronoi cell in a Voronoi diagram; receiving, by an incident management application executing on a computer system in the telecommunications carrier network, a first plurality of alarms, each associated with one of a first plurality of the NEs; determining, by the incident management application, that a subset of the first plurality of alarms are associated with a large-scale event (LSE) based on a) a quantity of the subset being at least a predetermined quantity, b) each of the subset having a same alarm signature, c) each of the subset occurring within a predetermined window of time, and d) the associated NE of each of the subset being within a predetermined number of neighbor hops from the associated NE of another of the subset, where adjacent Voronoi cells comprise a single neighbor hop; generating, by the incident management application, an LSE incident report, where each of the subset of the first plurality of alarms that are associated with the LSE are associated with the LSE incident report; and resolving, by the incident management application, the LSE incident report by implementing a control response for the NEs associated with the subset of the first plurality of alarms to clear the alarms on those NEs.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 4 is a flow chart of a method according to an embodiment of the disclosure.

FIG. 5 is a flow chart of another method according to an embodiment of the disclosure.

DETAILED DESCRIPTION

Figure 1:
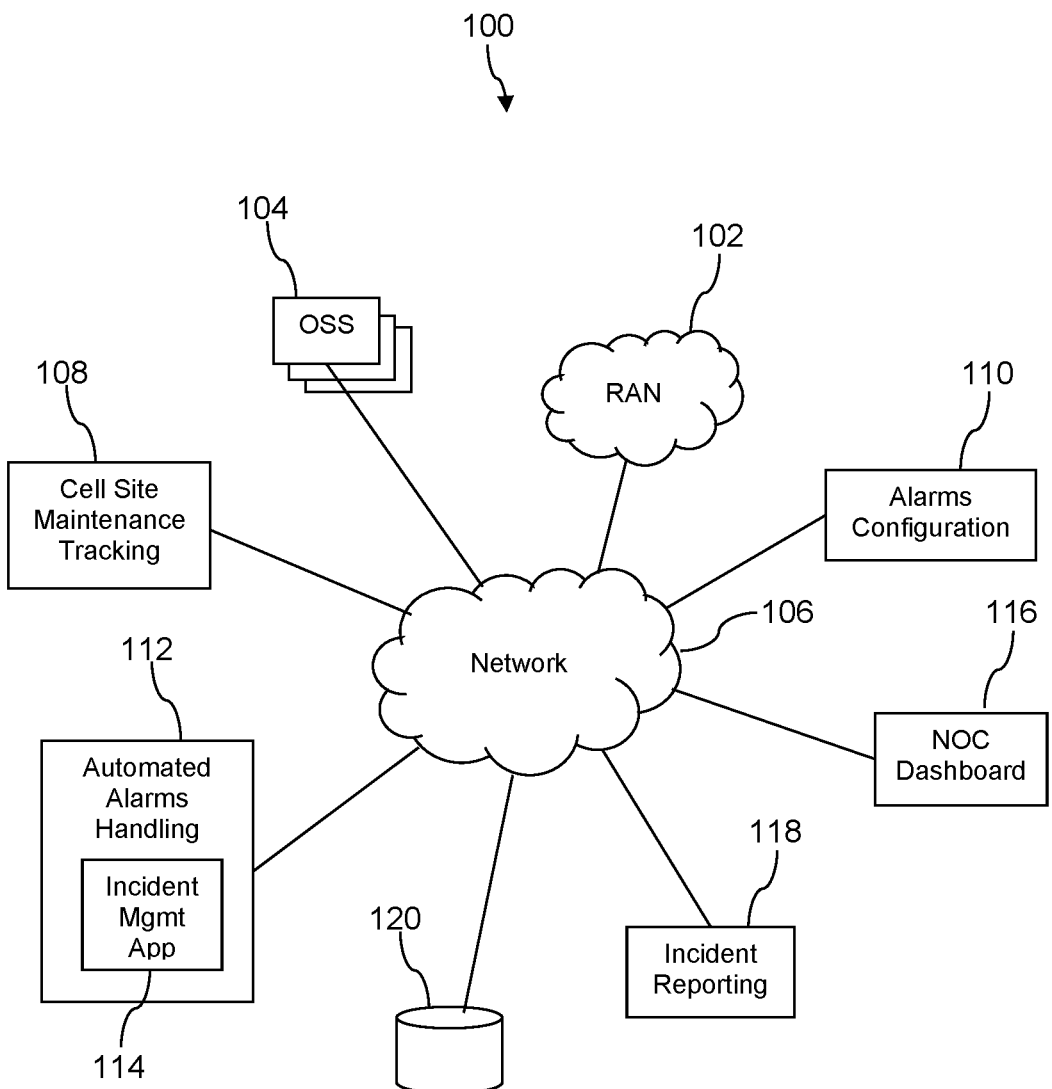
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Network elements (NEs) in a radio access network (RAN) may include cellular sites (or "cell" sites) as well as other communication network nodes, such as routers and/or gateways. The actual physical functioning and operability of the NEs within a particular region may be managed by a central monitoring system, such as a network operations center (NOC), of a telecommunications service providing company. For example, each of the NEs in the region may be subject to a variety of faults or failures, which result in raising of alarms which are picked up by OSSs. The alarms may be propagated upwards to the central monitoring station (e.g., as an incident report), and personnel at the central monitoring system may automatically or manually generate an incident report detailing an outage that caused the alarm.

Sometimes, different cell sites (or NEs) experience alarms that are traceable to a common cause, such as a severe weather event. It is desirable that such alarms be seen and considered as related to the same event so that they can be resolved in a suitable and often uniform manner. Such an event may be referred to as a large-scale event (LSE). LSEs may be identified by automation such as a computer program or a script executing on a computer. The automation may define a set of rules or criteria that a set of alarms must satisfy to qualify as related to an LSE. This criteria may involve some combination of (A) a minimum number of alarms (e.g., at least a predetermined quantity of alarms), (B) where the alarms are identical (or otherwise closely-related), (C) where the alarms are notified at about the same time (e.g., notified within a predetermined window of time), and (D) where the alarms are associated with cell sites or other NEs located proximate to each other (e.g., within a predetermined number of neighbor hops of each other). In some embodiments, when such an LSE is identified by automation, a master incident report is generated that lists the related alarms, and a unified and/or coordinated process of handling the master incident report associated with the LSE can be launched. For further details about LSEs, see U.S. patent application Ser. No. 18/308,514, entitled "Association of Related Incidents to a Telecommunication Network Large-Scale Event," filed Apr. 27, 2023, by Robert D. Lumpkins, et al, which is incorporated herein by reference in its entirety and U.S. patent application Ser. No. 18/352,982, titled "Telecommunication Network Large-Scale Event Root Cause Analysis," filed Jul. 14, 2023, by Jose A. Gonzalez, et al, which is incorporated herein by reference in its entirety.

As explained above, one characteristic of an LSE is that the alarms are generated at geographically proximate cell sites. In some instances, geographic proximity may be determined based on regional borders such as zip codes, states, or defined markets of the communications service provider. However, such regions may not provide a wholly accurate representation of proximity of cell sites. For example, while Texas and New Mexico are bordering states, a cell site in Houston is most likely not geographically proximate to a cell site in Albuquerque for purposes of identifying an LSE. A similar logic may be applied to zip codes, markets, and other such regional boundaries.

To address the foregoing, a Voronoi diagram is created that encompasses cell sites of a communications network. A Voronoi diagram identifies boundaries of regions (i.e., Voronoi cells) by calculating distances from specific points (e.g., NEs or cell sites), which may be referred to as seeds or sites, to surrounding points in the space. Each point in the space is assigned to the Voronoi cell associated with the closest seed, which forms a tessellation of the entire domain. In other words, one characteristic of Voronoi cells in a Voronoi diagram is that each point in the Voronoi cell is closer to the seed of that Voronoi cell than to any other seed in the domain. As described herein, a Voronoi diagram is not necessarily a graphical object, but rather may be a data artifact that represents the graphical content of the Voronoi diagram, where the data artifact is amenable to processing by software that is executable by one or more hardware processors.

Accordingly, each cell site is associated with one Voronoi cell in the Voronoi diagram. The resultant Voronoi diagram may be periodically updated (e.g., once per day, week, month, or the like), and/or may be updated in response to the addition of cell sites (or NEs) the communication network. Regardless of the particular construction of the Voronoi diagram (or the update frequency thereof), the Voronoi diagram may be useful to determine geographic proximity of cell sites (or NEs) in the communication network. In these examples, geographic proximity may be defined as a cell site being within a predetermined number of neighbor hops from another cell site, such as six neighbor hops away. Thus, for purposes of determining the existence of an LSE, a cell site that is within six neighbor hops of another cell site (where those cell sites also generate similar alarms in a similar time frame) is considered to be geographically proximate, and thus part of the LSE. On the other hand, a cell site that is more than six neighbor hops away from a particular cell site, even when those cell sites generate similar alarms at a similar time, is not considered to be geographically approximate, and is thus not part of the LSE.

Arranging cell sites in a Voronoi diagram thus enables a more realistic and accurate determination of whether cell sites are geographically proximate. However, due to irregular borders (e.g., coastal borders or national borders) of the communications network, a conventional Voronoi diagram may result in Voronoi cells that are technically neighboring (i.e., sharing a boundary), but whose associated cell sites are quite geographically disparate. For example, Voronoi cells associated with cell sites that are located on perpendicular coastlines (e.g., where the ocean or body of water is in the 90° included angle therebetween) may extend into the body of water and eventually intersect (i.e., forming a border between those Voronoi cells), and thus be considered neighboring (i.e., one neighbor hop away from each other). However, those cell sites may be a large distance from one another (e.g., each being miles, or 10 s or 100 s of miles or more, from the vertex of the coastline), and thus not actually geographically proximate. This is undesirable, because it may lead to the inclusion of cell sites in an LSE based on their associated Voronoi cells bordering each other, despite the fact that the cell sites are actually geographically disparate, and thus should not necessarily be grouped together in the same LSE. The foregoing also applies to national borders, or other borders of the communications network (e.g., at the edges of its coverage).

The present disclosure addresses the foregoing by trimming Voronoi cells that include a coastal border, a national border, or another type of border such as at the edge of coverage of the communications network. In the context of this description, trimming refers to bounding a Voronoi cell that includes such a border with a bounding line between a first side and a second side of the Voronoi cell that extend through the border. In alternate, or complementary embodiments, the underlying Voronoi diagram is altered modified, or otherwise adapted by trimming (e.g., truncating, curtailing, or otherwise limiting) Voronoi cells in a way that they would not typically be modified in constructing a conventional Voronoi diagram. In other words, embodiments of this disclosure alter a Voronoi diagram by "cutting short" one or more Voronoi cells from extending beyond the border, such as into the middle of open water, or into the middle of another country, or area outside of the coverage of the communications network. As a result, Voronoi cells that include such borders are less likely to intersect (and thus be considered neighbors to) other Voronoi cells that have associated cell sites that are actually geographically disparate, which improves the accuracy of adding (or not adding) cell sites to an LSE.

In some examples, the bounding line may be a straight line between the first and second side. In other examples, the bounding line may be a semi-circular line between the first and second side. Regardless of the particular shape of the bounding line, the bounding line may have the characteristic that a shortest distance between any point on the bounding line and any point on the border (e.g., coastal, national, or network coverage) is at least a first predetermined distance. Also, the bounding line may have the characteristic that a longest distance between any point on the bounding line and any point on the border is at most a second predetermined distance. In effect, the bounding line results in a Voronoi cell that includes all of the land area inside of the border (regardless of border type), but reduces or minimizes the area outside of the border (regardless of border type) that is included in the Voronoi cell.

Referring again to the above example in which Voronoi cells are associated with cell sites that are located on perpendicular coastlines, the resultant trimmed Voronoi cells would not extend far enough into the body of water to intersect, and thus would not be considered neighboring Voronoi cells. As a result, whether their associated cell sites are sufficiently close to be grouped together in an LSE will be determined on a more accurate number of neighbor hops between the trimmed Voronoi cells, and not based on the fact that untrimmed Voronoi cells happened to share a boundary because of the coastline (or other border) geometry.

This is desirable, because the accuracy of determining an LSE is improved, and false inclusion of cell sites in an LSE is reduced. It is also desirable to properly associate alarms and/or incident reports to an LSE, when that is appropriate, to support various regulatory requirements on reporting communication service outages (for example, 911 service being unavailable temporarily). Proper association of alarms and/or incident reports to an LSE is also desirable when vendor equipment is involved: for example, an electric power company service, for example a backhaul link provided by a local exchange company (LEC) or alternative access vendors (AAVs), whereby to recover expenses from the vendor and to task a vendor with fixing the problems. On the other hand, it is preferred to not bulk assign alarms and/or incident reports to a current LSE by rote or by a simplistic criteria. The improved association of alarms and/or incident reports to LSEs by better defining geographic proximity using a Voronoi diagram is a solution to a technical problem that springs from automated, computer-based management of large telecommunication networks.

The present disclosure teaches a specific technical solution to the problem of correctly associating alarms and/or incident reports to LSEs. An incident management application can analyze alarms and/or incident reports not currently associated to an LSE (e.g., not associated to a master incident report associated with the LSE) and determine that they should be associated to the LSE. The NEs (e.g., cell sites) that generate the alarms and/or incident reports are each associated with a Voronoi cell in a Voronoi diagram.

Then, the incident management application may automatically associate at least a subset of the alarms and/or incident reports to the LSE based on a) a quantity of the subset being at least a predetermined quantity, b) each of the subset having a same alarm signature, c) each of the subset occurring within a predetermined window of time, and d) the associated NE of each of the subset being within a predetermined number of neighbor hops from the associated NE of another of the subset. In this example, adjacent Voronoi cells comprise a single neighbor hop. The incident management application generates an LSE incident report in which each of the subset of the plurality of alarms that are associated with the LSE are associated with the LSE incident report. In some examples, the predetermined quantity of the subset is 6 (i.e., fewer than 6 alarms does not result in determining that an LSE occurs); the predetermined window of time is 15 minutes (i.e., alarms occurring outside of 15 minutes from each other does not result in determining that an LSE occurs); and the predetermined number of neighbor hops is 6 (i.e., alarms occurring more than 6 neighbor hops from other alarms are not considered sufficiently geographically proximate to result in determining that an LSE occurs). In some examples, a same alarm signature may be that the alarms are of different types, but likely caused by a similar or same root cause; in other examples, a same alarm signature refers to the alarms being of a same type.

In an embodiment, the incident management application may resolve the LSE incident report by implementing a control response for the NEs associated with the subset of alarms to clear the alarms on those NEs. For example, the control response may include resetting various hardware devices of the NEs.

In an embodiment, the LSE may grow and shrink over time. For example, the incident management application may identify an alarm that occurs outside of the predetermined time window in which the LSE was originated, but that nonetheless shares an alarm signature with the subset of alarms associated with the LSE, and is within the predetermined number of neighbor hops from NEs associated with the LSE. Such identified alarm may be added to the LSE, such as by being associated with the LSE incident report. Also, the incident management application may disassociate a given alarm (and its associated NE) from the LSE incident report when the given alarm is cleared or otherwise resolved. In this way, the LSE may grow over time as new alarms come online and match the characteristics (alarm type, geographic proximity) of the LSE, while the LSE may shrink over time as alarms are cleared or otherwise resolved. This maintains an LSE incident report that more accurately reflects the current status of the LSE impact on the communications network. These embodiments are described further below, with reference to the accompanying figures.

Turning now to FIG. 1, a communication system 100 is described. In an embodiment, the communication system 100 comprises a radio access network (RAN) 102, a plurality of operational support systems (OSSs) 104, a network 106, a cell site maintenance tracking system 108, an alarms configuration system 110, an automated alarms handling system 112 that executes an incident management application 114, a network operation center (NOC) dashboard system 116, an incident reporting system (or application) 118, and a data store 120. In an embodiment, communication system 100 may be a telecommunications carrier network comprising the RAN 102. In an embodiment, the incident management application 114 functionality may be implemented by multiple separate applications, operating on separate computer systems, respectively.

The RAN 102 comprises a plurality of cell sites and backhaul equipment. In an embodiment, the RAN 102 comprises tens of thousands or even hundreds of thousands of cell sites. The cell sites may comprise electronic equipment and radio equipment including antennas. The cell sites may be associated with towers or buildings on which the antennas may be mounted. The cell sites may comprise a cell site router that couples to a backhaul link from the cell sites to the network 106. The cell sites may provide wireless links to user equipment (e.g., mobile phones, smart phones, personal digital assistants, laptop computers, tablet computers, notebook computers, wearable computers, headset computers) according to a 5G, a long-term evolution (LTE), code division multiple access (CDMA), or a global system for mobile communications (GSM) telecommunication protocol. In an embodiment, the OSSs 104 comprises tens or even hundreds of OSSs. The network 106 comprises one or more public networks, one or more private networks, or a combination thereof. The RAN 102 may from some points of view be considered to be part of the network 106 but is illustrated separately in FIG. 1 to promote improved description of the system 100.

The cell site maintenance tracking system 108 is a system implemented by one or more computers. Computers are discussed further hereinafter. The cell site maintenance tracking system 108 is used to track maintenance activities on network elements (e.g., cell site equipment, routers, gateways, and other network equipment). When a network element (NE) is in maintenance, alarms that may occur on the NE may be suppressed, to avoid unnecessarily opening incident reports related to such alarms that may be generated because of unusual conditions the equipment may undergo pursuant to the maintenance activity. When a maintenance action is completed, maintenance personnel may be expected to check and clear all alarms pending on the subject NE before the end of the time scheduled for the maintenance activity. Sometimes a maintenance action may extend beyond the scheduled maintenance window, pending alarms are no longer suppressed (because the scheduled maintenance window has closed), and incident reports may be generated based on the alarms. This can lead to creation of undesired incident reports. It is preferred that maintenance personnel who cannot complete a maintenance task in the scheduled maintenance interval use the cell site maintenance tracking system 108 to extend the scheduled maintenance interval, whereby alarms do not spuriously result in creation of incident reports.

The alarm configuration system 110 is a system implemented by one or more computers. The alarm configuration system 110 allows users to define rules and instructions for handling alarms, for example rules for automatic processing of alarms by the automated alarms handling system 112. The alarm configuration system 110 may define rules for when an alarm leads to automatic generation of an incident report, as described herein. The alarm configuration system 110 may define rules for how alarms are cleared.

Alarms are flowed up from NEs of the RAN 102 via the OSSs 104 to be stored in the data store 120. The NOC dashboard 116 can access the alarms stored in the data store 120 and provide a list of alarms on a display screen used by NOC personnel. NOC personnel can manually open incident reports on these alarms. In an embodiment, the NOC dashboard 116 provides a system that NOC personnel can use to monitor health of a carrier network (e.g., monitor the RAN 102 and at least portions of the network 106), to monitor alarms, to drill down to get more details on alarms and on NE status, to review incident reports, and to take corrective actions to restore NEs to normal operational status. The NOC dashboard 116 may interact with the data store 120, with the cell site maintenance tracking system 108, the OSSs 104, the RAN 102, and other systems. NOC personnel can use the NOC dashboard 116 to manually create incident reports based on alarms reviewed in a user interface of the NOC dashboard 116.

The incident reporting application (or system) 118 can monitor the alarms stored in the data store 120 and automatically generate incident reports on these alarms based in part on the alarm configurations created and maintained by the alarms configuration system 110. For example, an alarm configuration rule defined by the alarm configuration system 110 may indicate that an incident report is not to be opened related to a specific alarm until the alarm has been active for a predefined period of time, for example for five minutes, for ten minutes, for fifteen minutes, for twenty minutes, for twenty-five minutes, or some other period of time less than two hours. The time criteria for auto generation of incident reports may be useful to avoid opening and tracking incidents that are automatically resolved by other components of the system 100, as described further hereinafter. Incident reports may be referred to in some contexts or by other communication service providers as tickets or trouble tickets.

In an embodiment, the incident reporting application (or system) 118 can create incident reports pursuant to alarms on NEs. At least one of these incident reports may be related to a large-scale event (LSE), and this master incident report (e.g., an LSE incident report) covers the LSE and identifies alarms at a plurality of different NEs that are associated with the LSE. Alarms that are deemed related to the LSE are documented in the LSE master incident report, and the alarm information stored in the data store 120 may be updated to indicate that these alarms are associated with the LSE and/or with the LSE master incident report.

The incident management application 114 may operate upon incident reports in a sequence of processes. In an embodiment, the incident management application 114 may perform automated triage on incident reports that includes automated enrichment of alarms and/or incident reports, automated dispatch to field operations personnel for some incident reports, and automated testing. Automated enrichment may comprise looking-up relevant information from a plurality of disparate sources and attaching this relevant information to the incident report. The looked-up information may comprise local environmental information such as weather reports, rainfall amounts, temperature, wind. The looked-up information may comprise logs of recent maintenance activities at the affected NE.

The automated triage process may involve determining a probable root cause for the incident and adding this to the incident report during the enrichment action. The probable root causes may be categorized as related to electric power, backhaul (e.g., transport), maintenance, or equipment (e.g., RAN hardware related), but within these general categories it is understood there may be a plurality of more precise probable root causes. The automated triage process can assign an incident report to personnel for handling based on its determination of the probable root cause of the incident report.

In an embodiment, the incident management application 114 may automatically close an incident report when NE status warrants such automated closure. Automated closure may happen because NOC personnel have taken manual corrective action to restore proper function of one or more NEs. Automated closure may happen because the incident management application 114 determines that the incident report was created pursuant to a maintenance action that extended beyond the scheduled maintenance interval and that the scheduled maintenance interval was later extended, but extended after a related incident report had already been generated. The incident management application 114 may perform automated remediation of alarm conditions associated with incident reports. For example, cell sites can be reset to restore operation and clear alarmed conditions. For example, cell sites can be locked and unlocked to restore operation and clear alarmed conditions. For example, cell sites may be resynched with GPS. For example, a software or firmware update may be pushed to cell sites.

The NOC dashboard 116 provides a system that NOC personnel can use to monitor health of a carrier network (e.g., monitor the RAN 102 and at least portions of the network 106), to monitor alarms, to drill down to get more details on alarms and on NE status, to review incident reports, and to take corrective actions to restore NEs to normal operational status. The NOC dashboard 116 may interact with the data store 120, with the cell site maintenance tracking system 108, the OSSs 104, the RAN 102, and other systems. NOC personnel can use the NOC dashboard 116 to manually create incident reports based on alarms reviewed in a user interface of the NOC dashboard 116.

When the incident management application 114 determines that alarms associated with a plurality of proximate cell sites or other NEs were generated at about the same time (e.g., within a predefined time interval) and are located geographically proximate to each other, the incident management application 114 can automatically deem that a large-scale event (LSE) is associated with these alarms. The incident management application 114 can automatically generate a master incident report to cover the LSE and can automatically link the associated alarms to the master incident report. The master incident report will be addressed in a holistic and coordinated manner, rather than each separate alarm related to the LSE being assigned to different incident reports and being handled by different personnel who handle each alarm separately and in an uncoordinated manner. Additionally, properly associating alarms to an LSE contributes to improved reporting to regulatory bodies and tasking responsible third parties and/or vendors with supporting and repairing their equipment.

It is understood that different definitions of an LSE can apply under different circumstances. In an embodiment, an LSE may be defined as the same alarm occurring at about the same time at six or more NEs in proximity to each other. A first NE may be said to be proximate to a second NE if it is within six neighbor hops of the second NE. Six "neighbor hops" in this context may be a jump from a Voronoi cell associated with a first cell site to a bordering (i.e., adjacent) Voronoi cell associated with a second cell site (first hop), from the Voronoi cell associated with the second cell site to a Voronoi cell associated with a third cell site (second hop), from the Voronoi cell associated with the third cell site to a Voronoi cell associated with a fourth cell site (third hop), from the Voronoi cell associated with the fourth cell site to a Voronoi cell associated with a fifth cell site (fourth hop), from the Voronoi cell associated with the fifth cell site to a Voronoi cell associated with a sixth cell site (fifth hop), and from the Voronoi cell associated with the sixth cell site to a Voronoi cell associated with a seventh cell site (sixth hop). Thus, any set of six NEs that have the same alarm raised at about the same time that can be linked to one of the set of six NEs by six hops or less may be deemed an LSE. In one theoretical example, the total hops of the boundary of the LSE may extend 30 hops (e.g., if all the NEs in the LSE are aligned in a farthest spaced-apart line), but need not necessarily be so extended.

An LSE identifying algorithm can be used to discover neighboring NEs that have the same alarm raised at about the same time. This can involve checking all NEs within six hops of a given NE in alarm for the same alarm. When another NE that qualifies is found, the algorithm can additionally check all NEs within six hops of the additional NE. This process of expanding the search for NEs having the same alarm within six hops or less of another NE having the subject alarm defines a boundary of the LSE.

A telecommunication service provider may subdivide its network into markets and task personnel to maintain the overall network in market segments. Thus, a first team may be assigned to maintain the network in a first market, a second team may be assigned to maintain the network in a second market, and so forth. A telecommunication service provider may subdivide a network spanning the United States with sixty or more markets. Sometimes LSEs extend across market boundaries. To support the market-directed maintenance of the network, in an embodiment, a separate master incident report may be generated for the same LSE in two or more different markets. Thus, a given LSE may be associated with a first master incident report associated with NEs located in a first market, a second master incident report associated with NEs located in a second market, and a third master incident report associated with NEs located in a third market. It is observed that sometimes LSEs spread across large areas due to a common weather event, such as due to a hurricane, due to a string of tornadoes, or due to freezing rain event.

Figure 2A:
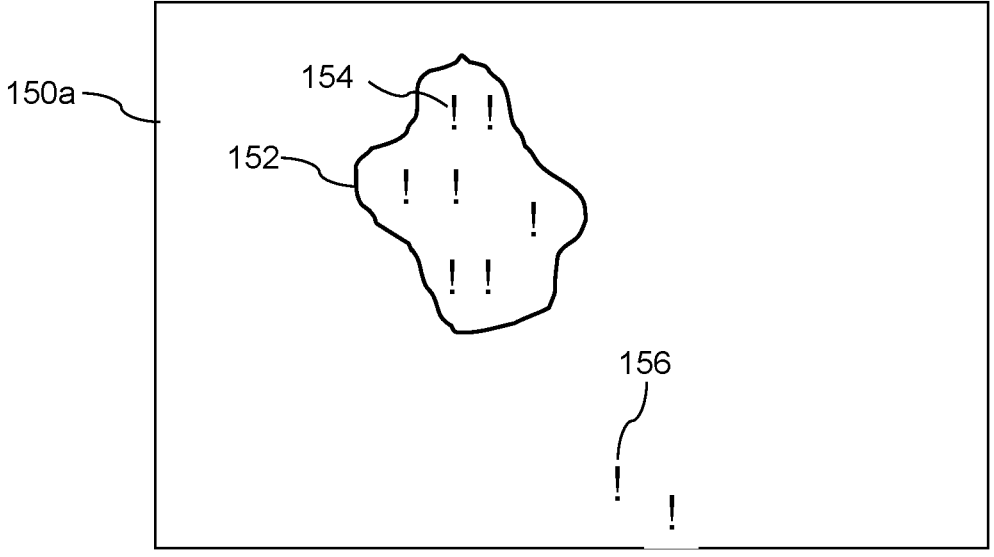
FIG. 2A and FIG. 2B are illustrations of a large-scale event (LSE) at a first time and at a later time as the LSE evolves according to an embodiment of the disclosure.

Turning now to FIG. 2A, a view 150a of a portion of the RAN 102 is illustrated. An LSE is defined that includes six alarms 154. The alarms 154 may be the same alarm identities associated with different NEs, for example associated with different cell sites. The alarms 154 may have started at about the same time, for example within 30 seconds of each other, within 1 minute of each other, within 5 minutes of each other, or within some other relatively short interval of time. The alarms 154 are associated with NEs that are geographically proximate to each other (e.g., having associated Voronoi cells that are within a predetermined number of neighbor hops of each other). A boundary 152 is drawn around the NEs that are deemed affected by the LSE. Two alarms 156 may have the same alarm identity as the alarms 154 and may have started at about the same time as the alarms 154, but the two alarms 156 are associated with NEs that are separated by too great a number of neighbor hops from the boundary 152 of the LSE at the time represented in view 150a. The incident reporting system 118 may generate a master LSE incident report associated with the LSE that references the alarms 154, a second incident report associated with a first one of the alarms 156, and a third incident report associated with a second one of the alarms 156.

Figure 2B:
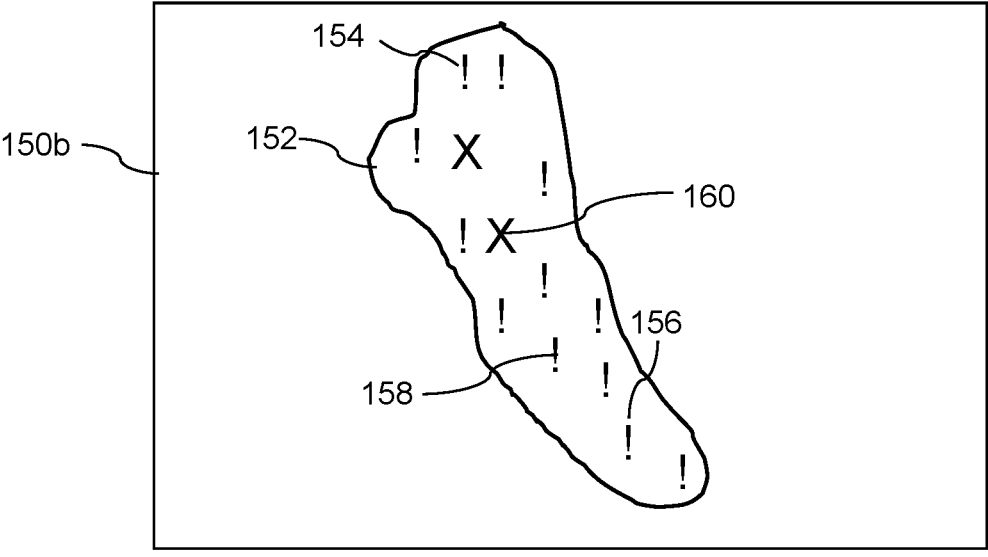

Turning now to FIG. 2B, a view 150b of the portion of the RAN 102 is illustrated at a later time. At the later time represented in FIG. 2B, four additional alarms 158 have started associated with NEs geographically between the boundary 152 in FIG. 2A and the alarms 156. The additional alarms 158, because they are sufficiently close to the boundary 152 and have the same alarm identity as the alarms 154, are deemed to be part of the same LSE. Because the previously existing alarms 156 have the same alarm identity as the alarms 154 and are now geographically proximate to an expanded boundary of the LSE (e.g., having associated Voronoi cells that are within a predetermined number of neighbor hops of the expanded boundary of the LSE), the previously existing alarms 156 are deemed at the time of the view 150b to be part of the LSE. The expanded boundary 152 of the LSE in FIG. 2B is shown enclosing alarms 154, 156, 158. Two of the previously existing alarms 154, represented in FIG. 2B by large "X" 160 indications, have been cleared. The expansion of a definition of an LSE over time (and contraction, as alarms are cleared), as illustrated in FIG. 2A and FIG. 2B, is common. A cause of an LSE may be some weather event, and different NEs may be affected at different times by the same weather event. Because the previously existing alarms 156 are now deemed associated with the LSE, the previously opened incident reports for the two alarms 156 may be linked to the master LSE incident report associated with the LSE. The previously opened incident reports for the two alarms 156 may be deleted or they may be retained to provide continuity of reporting information and reassigned to personnel assigned to handle the master LSE incident report.

Figure 3A:
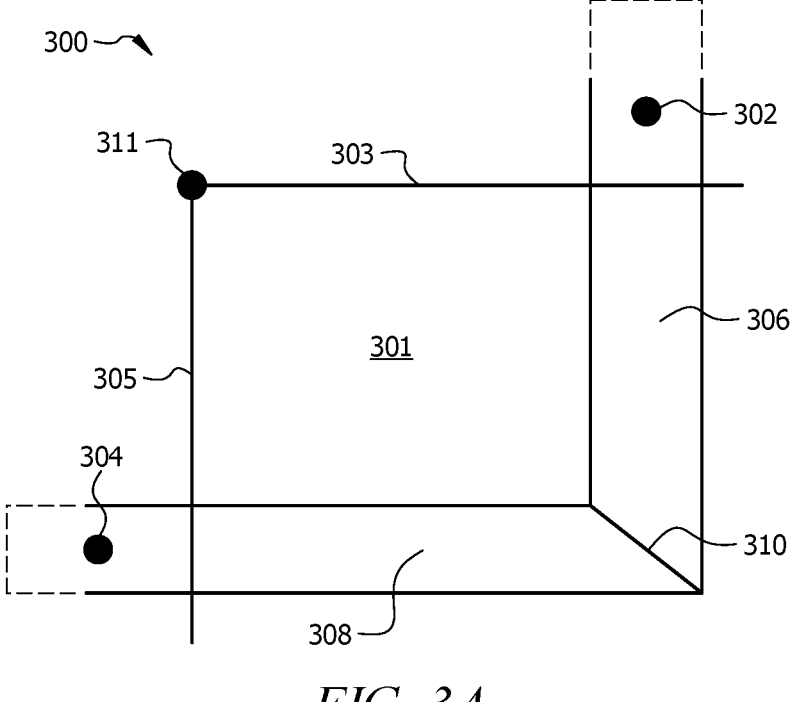
FIG. 3A and FIG. 3B are schematic illustrations of a plurality of NEs of a telecommunications carrier network associated with Voronoi cells in a Voronoi diagram, and trimmed Voronoi cells in a Voronoi diagram, respectively, according to embodiments of the disclosure.

FIG. 3A is a schematic of a portion of a Voronoi diagram 300 including at least a first cell site 302 and a second cell site 304. The first cell site 302 is located proximate to a first coastline 303 (e.g., an exemplary border, which could also be a national border, or an edge of coverage of a communications network), and the second cell site 304 is located proximate to a second coastline 305. In this example, the first coastline 303 is perpendicular to the second coastline 305, and a body of water 301 is formed in the 90° included angle therebetween.

A Voronoi cell 306 is associated with the first cell site 302, and a Voronoi cell 308 is associated with the second cell site 304. The Voronoi cells 306, 308 each extend into the body of water 301 and eventually intersect, forming a border 310 therebetween. Accordingly, for the purposes of determining neighbor hops, cell sites 302 and 304 may be considered neighboring or adjacent (i.e., one neighbor hop away from each other). However, as explained above, the cell sites 302, 304 may actually be a large distance from one another (e.g., each being miles, or 10 s or 100 s of miles or more, from a vertex 311 of the coastlines 303, 305), and thus not actually geographically proximate. This is undesirable, because it may lead to the inclusion of cell sites 302, 304 in an LSE based on their associated Voronoi cells 306, 308 bordering each other, despite the fact that the cell sites 302, 304 are actually geographically disparate, and thus should not necessarily be grouped together in the same LSE. The foregoing also applies to national borders, or other borders of the communications network (e.g., at the edges of its coverage).

Figure 3B:
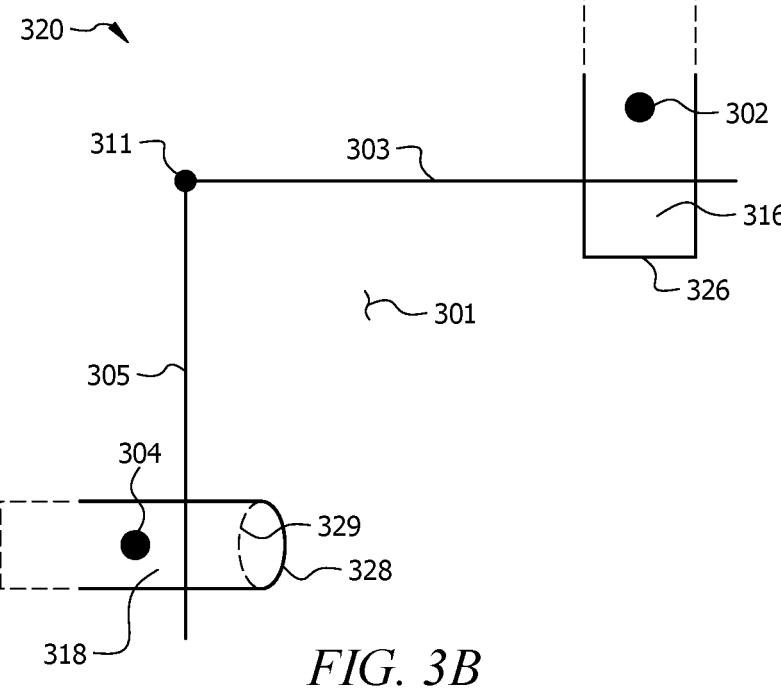

The present disclosure addresses the foregoing by trimming Voronoi cells that include a coastal border, a national border, or another type of border such as at the edge of coverage of the communications network. FIG. 3B is a schematic of a portion of a Voronoi diagram 320 including the cell sites 302, 304 described above, associated with trimmed Voronoi cells 316, 318, respectively. As described above, trimming refers to bounding the Voronoi cell 316, 318 that includes such a border (e.g., coastline 303, 305, respectively) with a bounding line that is between a first side and a second side of the Voronoi cell, where the first and second sides extend through the border. For example, the Voronoi cell 316 is "cut short" from overextending beyond the border 303 by bounding line 326—and the Voronoi cell 318 is cut short from overextending beyond the border 305 by bounding line 328 (or alternate bounding line 329)—such as into the middle of open water 301. As a result, the trimmed Voronoi cells 316, 318 are less likely to intersect (and thus be considered neighbors to), which improves the accuracy of adding (or not adding) cell sites 302, 304 to an LSE.

Bounding line 326 is an example of a straight bounding line between the first and second side of Voronoi cell 316. Bounding line 328 is an example of a convex semi-circular bounding line between the first and second side of Voronoi cell 318, while an alternate bounding line 329 is an example of a concave semi-circular bounding line between the first and second side of Voronoi cell 318. Regardless of the particular shape of the bounding lines 326, 328, 329, the bounding lines 326, 328, 329 may have the characteristic that a shortest distance between any point on the bounding line 326, 328, 329 and any point on the border 303, 305 is at least a first predetermined distance, which may be as small as zero. That is, the first predetermined distance may be such that the bounding line 326, 328, 329 touches the border 303, 305 at one point. Also, the bounding line 326, 328, 329 may have the characteristic that a longest distance between any point on the bounding line 326, 328, 329 and any point on the border 303, 305 is at most a second predetermined distance. That is, the extent to which the trimmed Voronoi cell 316, 318 extends into the body of water 301 may be limited by the second predetermined distance. In effect, the trimmed Voronoi cells 316, 318 include all of the land area inside of the border (regardless of border type), but reduce or minimize the area outside of the border (regardless of border type) that is included in the trimmed Voronoi cell 316, 318.

As shown in FIG. 3B, the resultant trimmed Voronoi cells 316, 318 do not extend far enough into the body of water 301 to intersect, and thus would not be considered neighboring Voronoi cells. As a result, whether their associated cell sites 302, 304 are sufficiently close to be grouped together in an LSE will be determined on a more accurate number of neighbor hops between the trimmed Voronoi cells 316, 318, and not based on the fact that untrimmed Voronoi cells 306, 308 from FIG. 3A happened to share a boundary 310 because of the coastline 303, 305 geometry. This is desirable, at least because the accuracy of determining an LSE is improved, and false inclusion of cell sites 302, 304 in an LSE is reduced.

Figure 3C:
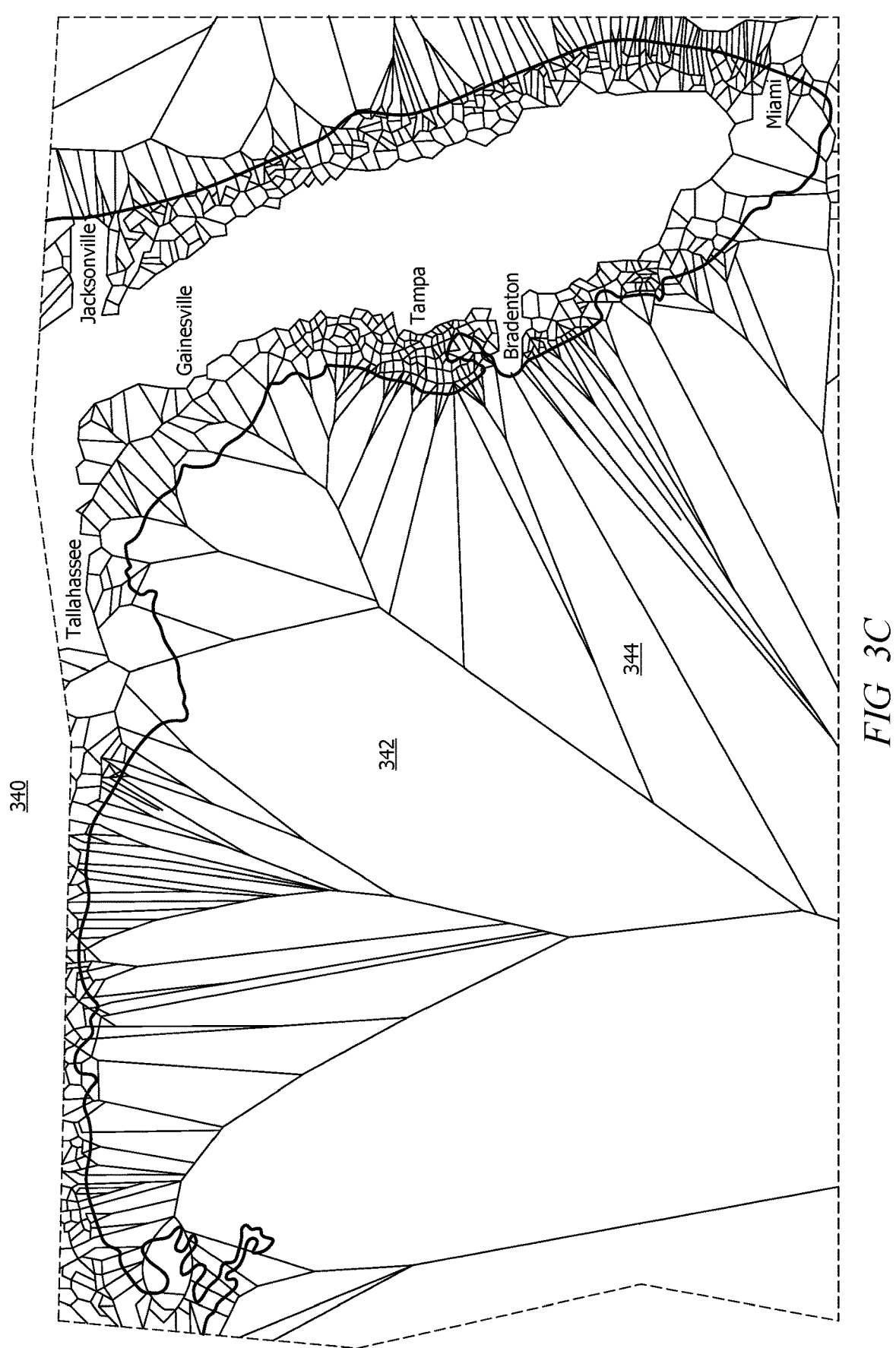
FIG. 3C and FIG. 3D are schematic illustrations of NEs of a telecommunications carrier network, proximate to a coastal boundary, associated with Voronoi cells in a Voronoi diagram, and trimmed Voronoi cells in a Voronoi diagram, respectively, according to embodiments of the disclosure.
Figure 3D:
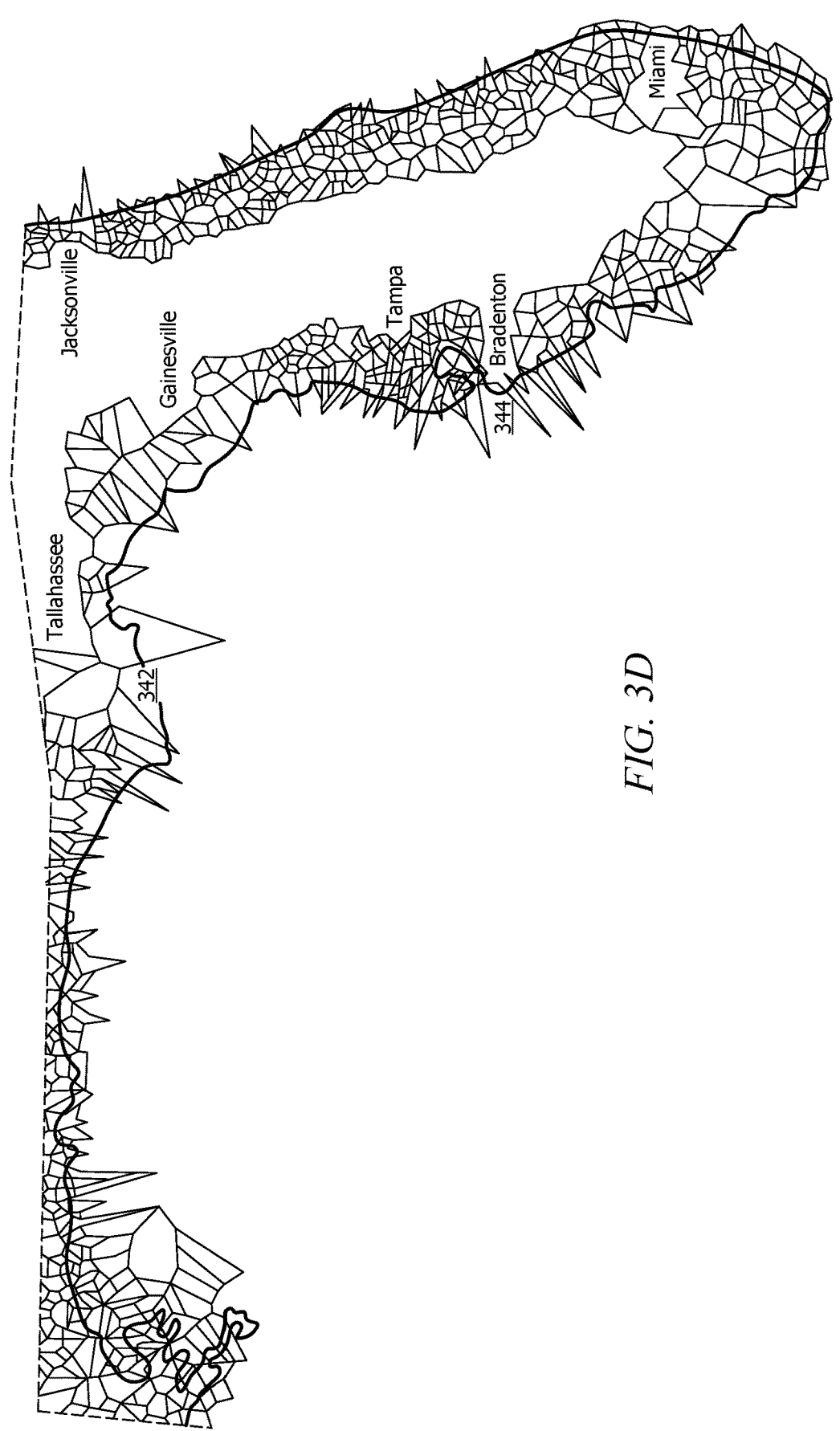

FIG. 3C shows a specific example of a Voronoi diagram 340, in which Voronoi cells 342, 344 are present. The Voronoi cells 342, 344 are also shown in FIG. 3D as being trimmed with respect to a coastal border. As described above, trimming refers to bounding the Voronoi cell 342, 344 that includes a border (e.g., coastline in this example) with a bounding line that is between a first side and a second side of the Voronoi cell, where the first and second sides extend through the border. For example, in FIG. 3C, the Voronoi cell 342 abuts the Voronoi cell 344, and thus their associated cell sites would be considered neighbors (e.g. one-hop neighbors). Of course, the cell sites associated with the Voronoi cells 342, 344 are not at all geographically proximate, and thus it is not useful for those cell sites to be considered as neighbors, such as for the purposes of determining an LSE, merely because the Voronoi cells 342, 344 abut one another.

Turning to FIG. 3D, the Voronoi cell 342 is "cut short" from overextending beyond the coastal border, and the Voronoi cell 344 is similarly cut short from overextending beyond the coastal border. As a result, the trimmed Voronoi cells 342, 344 are less likely to intersect (and thus their associated cell sites are less likely to be considered neighbors to one another), which improves the accuracy of adding (or not adding) their associated cell sites to an LSE.

With reference now to FIG. 1, FIG. 2A, FIG. 2B, and FIGS. 3A-3D, the incident management application 114 may periodically analyze alarms stored in the data store 120 and incident reports stored by the incident reporting system 118. The incident management application 114 may associate various NEs (e.g., cell sites) with Voronoi cells in a Voronoi diagram. In an example, each Voronoi cell in the Voronoi diagram is associated with only one NE, to facilitate determining whether certain NEs or cell sites are within a predetermined number of neighbor hops from each other.

The incident management application 114 may also analyze various alarms to identify that a boundary 152 of an LSE is expanding and link or otherwise associate new alarms and/or previously existing alarms and incident reports to the LSE, for example by linking or associating to the LSE master incident report. The incident management application 114 can periodically analyze alarms stored in the data store 120 every five minutes, every ten minutes, every fifteen minutes, every twenty minute, every twenty-five minutes, every thirty minutes, or some other periodic time interval less than forty-eight hours. The time criteria for alarm initiation may be increased after the initial LSE is determined. For example, while on initial identification of an LSE may use a first time threshold for including alarms in an LSE, later a second time threshold may be used that is greater than the first time threshold. For example, the first time threshold may be five minutes and the second time threshold may be fifteen minutes. As the boundary 152 of the LSE expands, the incident management application 114 may use a third time threshold that is greater than the second time threshold, for example, a time threshold of forty-five minutes. The relaxation of the time threshold for alarm initiation for LSEs makes sense in that an LSE may begin first at a narrowly focused geographical location and then shift geographical location over time, for example as a string of severe thunderstorms progresses through a large regional area.

The incident management application 114 may also analyze various alarms to determine whether they are associated with an LSE. An alarm being associated with an LSE may be based on a) a quantity of the subset being at least a predetermined quantity, b) each of the subset having a same alarm signature, c) each of the subset occurring within a predetermined window of time, and d) the associated NE of each of the subset being within a predetermined number of neighbor hops from the associated NE of another of the subset. In this example, adjacent Voronoi cells comprise a single neighbor hop. The incident management application 114 generates an LSE incident report in which each of the subset of the plurality of alarms that are associated with the LSE are associated with the LSE incident report. In some examples, the predetermined quantity of the subset is 6 (i.e., determining that an LSE occurs requires at least 6 alarms); the predetermined window of time is 15 minutes (i.e., determining that an LSE occurs requires at least 6 alarms occurring within 15 minutes of each other); and the predetermined number of neighbor hops is 6 (i.e., determining that an LSE occurs requires at least 6 alarms occur within 15 minutes of each other within 6 neighbor hops from other such alarms). In some examples, a same alarm signature may be that the alarms are of different types, but likely caused by a similar or same root cause; in other examples, a same alarm signature refers to the alarms being of a same type.

In an embodiment, the incident management application 114 may resolve the LSE incident report by implementing a control response for the NEs associated with the subset of alarms to clear the alarms on those NEs. For example, the control response may include resetting various hardware devices of the NEs. In another embodiment, the control response may include generating an incident report, whereby a technician (e.g., a NOC employee or a field technician) resolves a service-affecting alarm on the NE(s). For example, a field technician may be dispatched in a service truck to visit a cell site and replace an item of equipment and/or to install a software or firmware update.

In an embodiment, the LSE may grow and shrink over time. For example, the incident management application 114 may identify an alarm that occurs outside of the predetermined time window in which the LSE was originated (either earlier or later), but that nonetheless shares an alarm signature with the subset of alarms associated with the LSE, and is within the predetermined number of neighbor hops from NEs associated with the LSE. Such identified alarm may be added to the LSE, such as by being associated with the LSE incident report. Also, the incident management application 114 may disassociate a given alarm (and its associated NE) from the LSE incident report when the given alarm is cleared or otherwise resolved. In this way, the LSE may grow over time as new alarms come online and match the characteristics (alarm type, geographic proximity) of the LSE, while the LSE may shrink over time as alarms are cleared or otherwise resolved. This maintains an LSE incident report that accurately reflects the current status of the LSE impact on the communications network.

While the discussion of FIG. 2A, FIG. 2B, FIGS. 3A-3D is related to a single LSE, it is understood that the incident management application 114, the incident reporting system 118, and the NOC dashboard 116 may be concurrently coping with a plurality of isolated LSEs across a large network. For example, the incident management application 114 and incident reporting system 118 may be coping with a first LSE in Florida, a second LSE in the Boston area, a third LSE in Iowa, and a fourth LSE in the Seattle area. Each of these four LSEs may result from separate and unrelated local causes.

In an embodiment, the NOC dashboard 116 provides a user interface that allows a NOC worker to investigate an LSE. The user interface may provide access to an LSE wizard screen that lists alarms not currently associated to the given LSE and provide a control input for adding one or more alarms and/or NEs to the LSE in a convenient, simple manner. The wizard screen may present a sequence of actions to be taken by a user (e.g., a NOC worker) to take including (1) select the master LSE incident report, (2) select the child incident reports (e.g., one or more incident report to be subsumed under the master LSE incident report), and (3) review/commit addition of child incident reports to the master LSE incident report. To support the second action identified above (select child incident reports), the wizard screen may provide a pick-list of such alarms, NEs, or incident reports to add to the LSE. The pick-list in the wizard screen may provide a drill-down function whereby NOC personnel can get further details on the subject child incident reports. When this pick-list is selected and activated (e.g., when reviewed and committed in the third action identified above), the incident management application 114, which is linked into the functionality of the user interface, can add these alarms and/or NEs into the LSE. This is a process that is essentially the same as the automated process except initiated manually by the NOC employee through the wizard screen. Some of the NEs suggested for addition to the LSE by the wizard screen may be NEs in maintenance status and hence NEs that have alarms suppressed at the current time but which could be expected to suffer from the same alarm condition of other proximate NEs that have been affected by the LSE.

Workers are assigned to resolve the master LSE incident report and take various actions to fix the associated alarms and bring the NEs involved in the master LSE incident report back into fully functioning condition. This may involve dispatching field operations personnel to go to cell sites to perform maintenance such as deicing antennas or removing snow accumulated in parabolic dish antennas used in backhaul. This may involve in dispatching field operations personnel to go to cell sites to install battery packs or to install a mobile generator. This may involve informing a third-party vendor to provide emergency power to one or more NEs. It is understood that there are a large variety of repairs that may be performed to restore the NEs involved in the master LSE incident report to fully functioning order, but that the appropriate association of alarms and incident reports to a master LSE incident report for an LSE helps to complete this fix in a holistic and coordinated manner that saves time and brings the NEs back on line more promptly. Additionally, the appropriate association of alarms and incident reports to a master LSE incident report promotes more accurate reporting to regulatory authorities on communication outages and more accurate financial dealings with third-party vendors.

Turning now to FIG. 4, a method 200 is described. In an embodiment, the method 200 is a method of maintaining a communication network that provides communication services to subscribers. At block 202, the method 200 comprises associating each of a plurality of network elements (NEs) of the telecommunications carrier network with a Voronoi cell in a Voronoi diagram. In an embodiment, at least some of the NEs are cell sites. A cell site may be referred to as a cell tower and comprises electronic equipment and one or more antennas. Some cell sites comprise a structure that supports the one or more antennas at a height above the ground such as a metal tower or building or water tower. In an embodiment, some of the NEs are routers. Also, as described above, the Voronoi cells may be trimmed if they include a border, such as a coastal border, national border, or other border that may result in Voronoi cells associated with geographically disparate NEs (e.g., cell sites) intersecting, and thus being considered adjacent or neighboring.

At block 204, the method 200 comprises receiving, by an incident management application 114 executing on a computer system in the telecommunications carrier network, a first plurality of alarms, each associated with one of a first plurality of the NEs.

At block 206, the method 200 comprises determining, by the incident management application 114, that a subset of the first plurality of alarms are associated with a large-scale event (LSE) based on a) a quantity of the subset being at least a predetermined quantity, b) each of the subset having a same alarm signature, c) each of the subset occurring within a predetermined window of time, and d) the associated NE of each of the subset being within a predetermined number of neighbor hops from the associated NE of another of the subset. In some examples, adjacent Voronoi cells comprise a single neighbor hop. In an embodiment, the incident management application 114 identifies the LSE based on proximity of NEs having active alarms, the similarity of alarms between the proximate NEs, and the time the alarms were generated by the NEs. At block 208, the method 200 comprises generating an LSE incident report that associates the subset of the first plurality of notifications of alarms that are associated with the LSE to the LSE incident report.

At block 210, the method 200 comprises resolving the LSE incident report by implementing a control response for (e.g., fixing) the NEs associated with the subset of the of alarms associated with the LSE to clear the alarms on the NEs. In an embodiment, the LSE incident report is resolved in a holistic manner. For example, the LSE incident report may be assigned to a technician who takes various action(s) to resolve the underlying alarm, such as replacing various equipment, installing or otherwise updating various firmware or software of an item of equipment at an NEs, or the like.

Turning now to FIG. 5, another method 230 is described. In an embodiment, the method 230 is a method of maintaining a communication network by associating incident reports associated with different cell sites to a large-scale event (LSE). At block 232, the method 230 comprises associating each of a plurality of cell sites of the telecommunications carrier network with a Voronoi cell in a Voronoi diagram, where each cell site is associated with a different Voronoi cell. At block 234, the method 230 comprises trimming at least one of the Voronoi cells that includes a coastal border or a national border. The Voronoi cells may also be trimmed if they include any border that may result in the Voronoi cells associated with geographically disparate cell sites intersecting, and thus being considered adjacent or neighboring.

At block 236, the method 230 comprises receiving, by an incident management application 114 executing on a computer system in the telecommunications carrier network, a first plurality of alarms, each associated with one of a first plurality of the cell sites.

At block 238, the method 230 comprises determining, by the incident management application 114, that a subset of the first plurality of alarms are associated with a large-scale event (LSE) based on a) a quantity of the subset being at least a predetermined quantity, b) each of the subset having a same alarm signature, c) each of the subset occurring within a predetermined window of time, and d) the associated Voronoi cell of each of the subset being within a predetermined distance in the Voronoi diagram from the associated Voronoi cell of another of the subset. The distance may be determined as a number of neighbor hops, for example, in which adjacent Voronoi cells comprise a single neighbor hop.

At block 240, the method 230 comprises generating an LSE incident report that associates the subset of the first plurality of notifications of alarms that are associated with the LSE to the LSE incident report.

At block 242, the method 230 comprises resolving the LSE incident report by implementing a control response for (e.g., fixing) the cell sites associated with the subset of the of alarms associated with the LSE to clear the alarms on the cell sites. In an embodiment, the LSE incident report is resolved in a holistic manner.

Figure 6A:
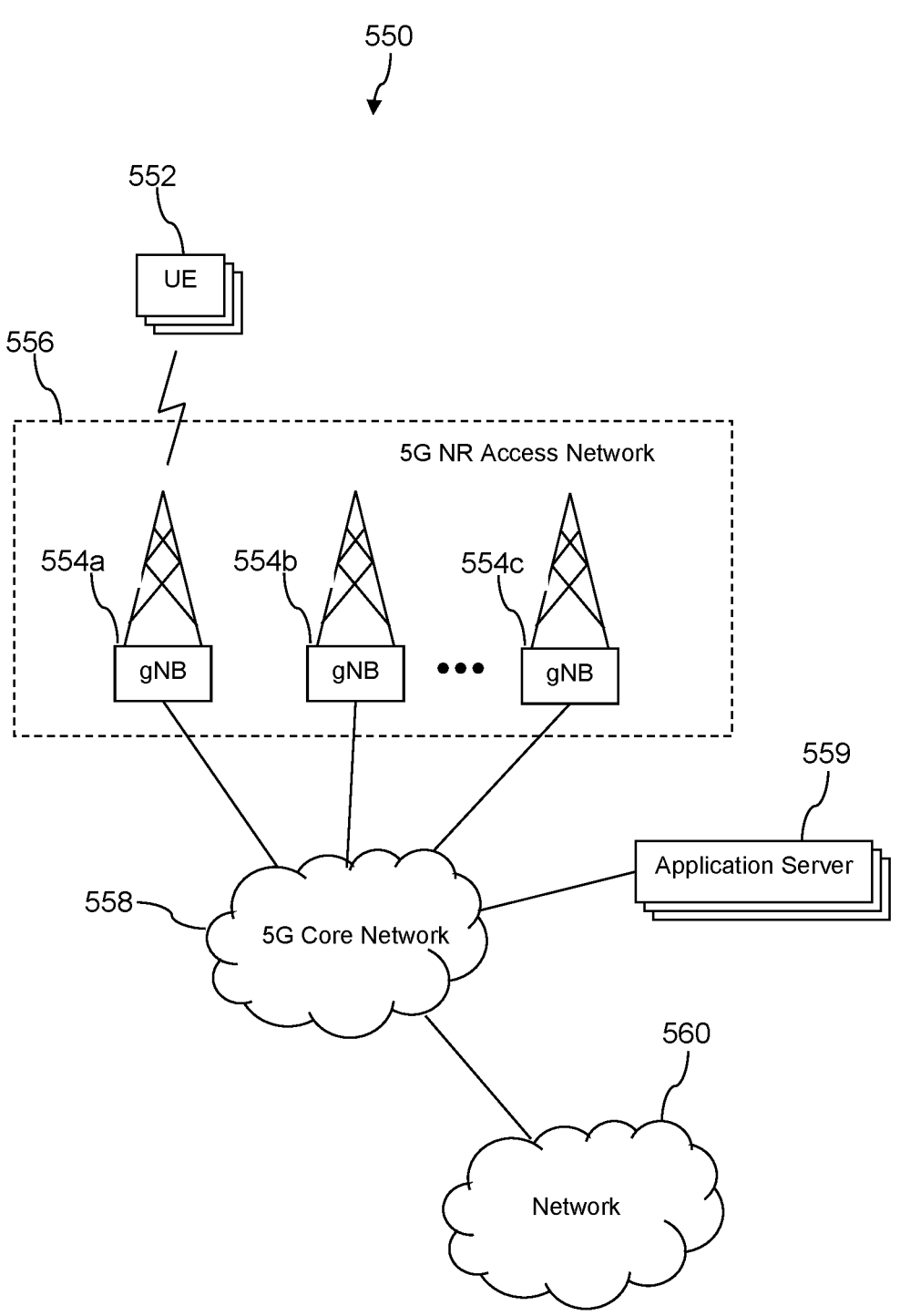
FIG. 6A and FIG. 6B are block diagrams of a 5G network according to an embodiment of the disclosure.

Turning now to FIG. 6A, an exemplary communication system 550 is described. Typically the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a next Generation Node B (gNB). In 4G technology (e.g., long term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"-such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 6B:
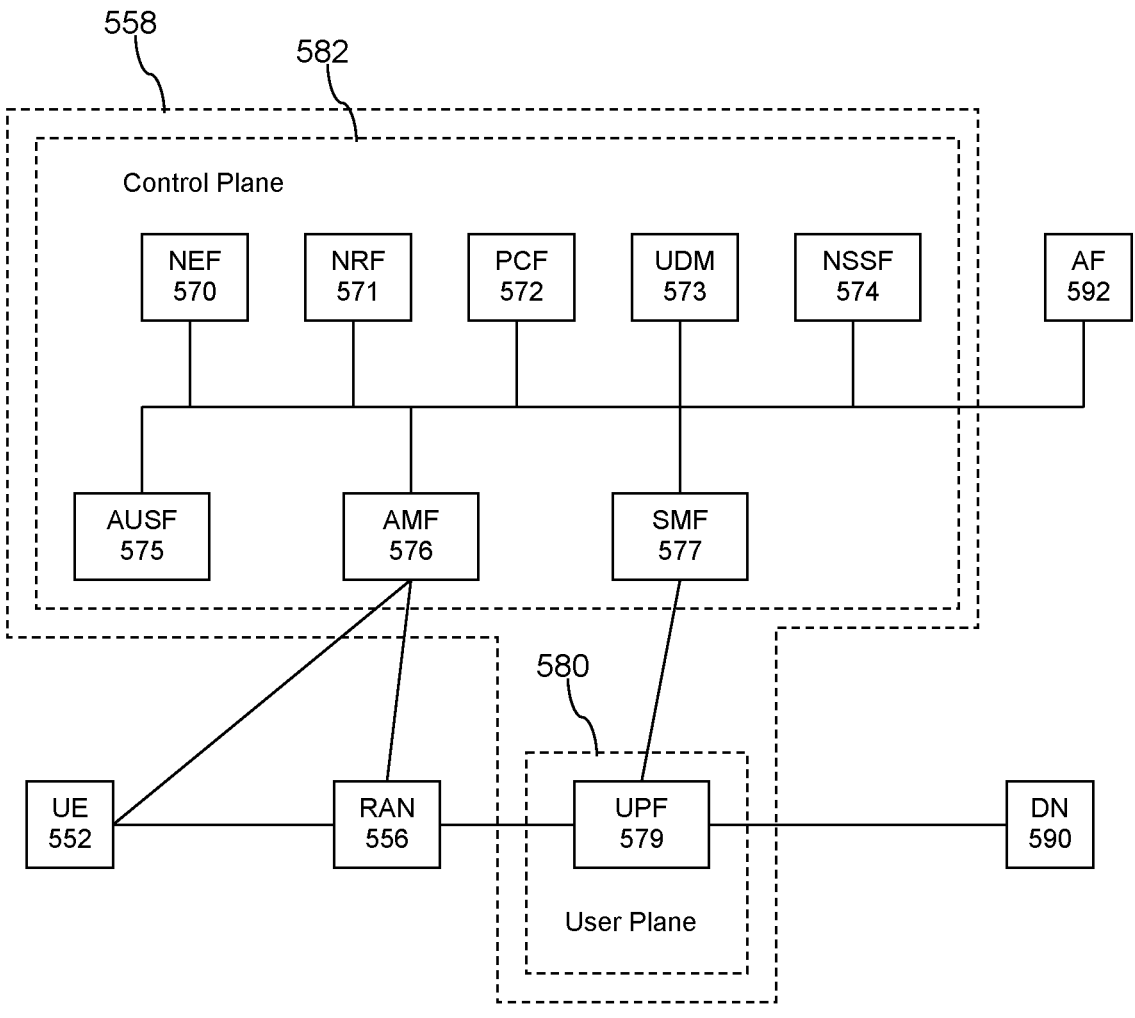

Turning now to FIG. 6B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 5A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be executed on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 7:
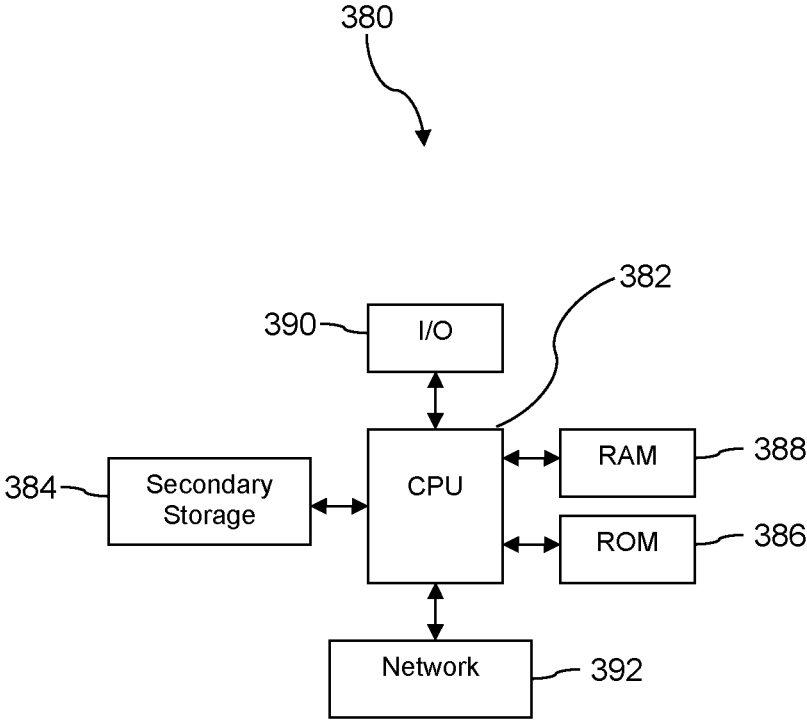
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for maintaining a telecommunications carrier network that provides communication services to subscribers, the method comprising:

associating each of a plurality of cell sites of the telecommunications carrier network with a Voronoi cell in a Voronoi diagram;

trimming at least one of the Voronoi cells that includes a coastal border or a national border;

receiving, by an incident management application executing on a computer system in the telecommunications carrier network, a first plurality of alarms, each associated with one of a first plurality of the cell sites;

determining, by the incident management application, that a subset of the first plurality of alarms are associated with a large-scale event (LSE) based on a) a quantity of the subset being at least a predetermined quantity, b) each of the subset having a same alarm signature, c) each of the subset occurring within a predetermined window of time, and d) the associated Voronoi cell of each of the subset being within a predetermined distance in the Voronoi diagram from the associated Voronoi cell of another of the subset;

generating, by the incident management application, an LSE incident report, wherein each of the subset of the first plurality of alarms that are associated with the LSE are associated with the LSE incident report; and resolving, by the incident management application, the LSE incident report by implementing a control response for the cell sites associated with the subset of the first plurality of alarms to clear the alarms on those cell sites.

2. The method of claim 1, wherein trimming the at least one of the Voronoi cells comprises bounding the Voronoi cell with a bounding line between a first side and a second side of the Voronoi cell, wherein the first side and the second side each extend through the coastal or national border, wherein the bounding line is straight or semi-circular, and wherein a shortest distance between any point on the bounding line and any point on the coastal or national border is at least a predetermined distance.

3. The method of claim 1, wherein after determining that the subset of the first plurality of alarms are associated with the LSE, the method further comprises:

identifying, by the incident management application, an alarm of the first plurality of alarms other than the subset, wherein the identified alarm occurs outside of the predetermined window of time; and associating, by the incident management application, the identified alarm with the LSE incident report based on a) the identified alarm having the same alarm signature as the subset, and b) the associated cell site of the identified alarm being within the predetermined distance in the Voronoi diagram from the associated cell site of one of the subset.

4. The method of claim 1, further comprising disassociating, by the incident management application, a given alarm and its associated cell site from the LSE incident report when the given alarm is cleared.

5. A telecommunication network management system implemented in a telecommunications carrier network, the system comprising:

an incident reporting application that executes on a first computer system, wherein the incident reporting application creates incident reports pursuant to a first plurality of alarms on network elements (NEs) of the telecommunication carrier network, wherein one of the incident reports is an LSE incident report associated with a large-scale event (LSE), and wherein the LSE incident report identifies alarms at a plurality of different NEs associated with the LSE; and an incident management application that executes on a second computer system, wherein the incident management application is configured to:

associate the NEs with a Voronoi cell in a Voronoi diagram;

determine that a subset of the first plurality of alarms are associated with a large-scale event (LSE) based on a) a quantity of the subset being at least a predetermined quantity, b) each of the subset having a same alarm signature, c) each of the subset occurring within a predetermined window of time, and d) the associated NE of each of the subset being within a predetermined number of neighbor hops from the associated NE of another of the subset, wherein adjacent Voronoi cells comprise a single neighbor hop; and generate an LSE incident report, wherein each of the subset of the first plurality of alarms that are associated with the LSE are associated with the LSE incident report.

6. The telecommunication network management system of claim 5, wherein the incident management application is further configured to resolve the LSE incident report by implementing a control response for the NEs associated with the subset of the first plurality of alarms to clear the alarms on those NEs.

7. The telecommunication network management system of claim 5, wherein after determining that the subset of the first plurality of alarms are associated with the LSE, the incident management application is further configured to:

identify an alarm of the first plurality of alarms other than the subset, wherein the identified alarm occurs outside of the predetermined window of time; and associate the identified alarm with the LSE incident report based on a) the identified alarm having the same alarm signature as the subset, and b) the associated NE of the identified alarm being within the predetermined number of neighbor hops from the associated NE of one of the subset.

8. The telecommunication network management system of claim 5, wherein the incident management application is further configured to disassociate a given alarm and its associated NE from the LSE incident report when the given alarm is cleared.

9. The telecommunication network management system of claim 5, further comprising trimming Voronoi cells that include a coastal border or a national border.

10. The telecommunication network management system of claim 5, wherein each Voronoi cell is associated with only one NE.

11. The telecommunication network management system of claim 5, wherein the predetermined quantity is 6, wherein the predetermined window of time is 15 minutes, and wherein the predetermined number of neighbor hops is 6.

12. The telecommunication network management system of claim 5, wherein at least some of the NEs comprise cell sites.

13. A method for maintaining a telecommunications carrier network that provides communication services to subscribers, the method comprising:

associating each of a plurality of network elements (NEs) of the telecommunications carrier network with a Voronoi cell in a Voronoi diagram;

receiving, by an incident management application executing on a computer system in the telecommunications carrier network, a first plurality of alarms, each associated with one of a first plurality of the NEs;

determining, by the incident management application, that a subset of the first plurality of alarms are associated with a large-scale event (LSE) based on a) a quantity of the subset being at least a predetermined quantity, b) each of the subset having a same alarm signature, c) each of the subset occurring within a predetermined window of time, and d) the associated NE of each of the subset being within a predetermined number of neighbor hops from the associated NE of another of the subset, wherein adjacent Voronoi cells comprise a single neighbor hop;

generating, by the incident management application, an LSE incident report, wherein each of the subset of the first plurality of alarms that are associated with the LSE are associated with the LSE incident report; and resolving, by the incident management application, the LSE incident report by implementing a control response for the NEs associated with the subset of the first plurality of alarms to clear the alarms on those NEs.

14. The method of claim 13, wherein after determining that the subset of the first plurality of alarms are associated with the LSE, the method further comprises:

identifying, by the incident management application, an alarm of the first plurality of alarms other than the subset, wherein the identified alarm occurs outside of the predetermined window of time; and associating, by the incident management application, the identified alarm with the LSE incident report based on a) the identified alarm having the same alarm signature as the subset, and b) the associated NE of the identified alarm being within the predetermined number of neighbor hops from the associated NE of one of the subset.

15. The method of claim 13, further comprising disassociating, by the incident management application, a given alarm and its associated NE from the LSE incident report when the given alarm is cleared.

16. The method of claim 13, further comprising trimming Voronoi cells that include a coastal border.

17. The method of claim 13, further comprising trimming Voronoi cells that include a national border.

18. The method of claim 13, wherein each Voronoi cell is associated with only one NE.

19. The method of claim 13, wherein the predetermined quantity is 6, wherein the predetermined window of time is 15 minutes, and wherein the predetermined number of neighbor hops is 6.

20. The method of claim 13, further comprising trimming at least one of the Voronoi cells by bounding the Voronoi cell with a bounding line between a first side and a second side of the Voronoi cell, wherein the first side and the second side each extend through a coastal or national border, wherein the bounding line is straight or semi-circular, and wherein a shortest distance between any point on the bounding line and any point on the coastal or national border is at least a predetermined distance.

* * * * *